United States Patent Office 3,419,410
Patented Dec. 31, 1968

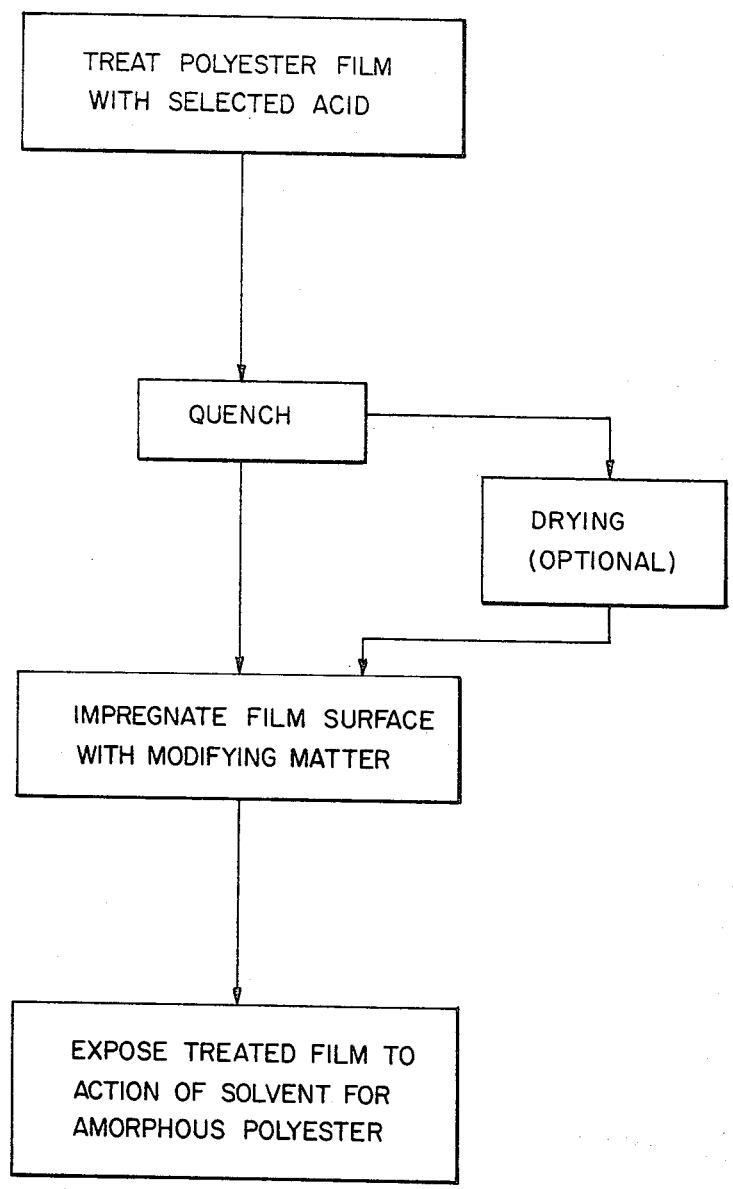

3,419,410
METHOD FOR TREATING POLYESTER FILM
Victor M. Kumin, Newton Highlands, and Carlos M. Samour, Wellesley Hills, Mass., assignors, by mesne assignments, to The G. T. Schjeldahl Company, Boston, Mass., a corporation of Massachusetts
Continuation-in-part of application Ser. No. 360,093, Apr. 15, 1964. This application June 5, 1967, Ser. No. 643,360
6 Claims. (Cl. 117—25)

ABSTRACT OF THE DISCLOSURE

A shaped article such as a film, foil, ribbon, or fabric, composed at least in part of crystalline polyethyleneterephthalate, is exposed to the action of chlorosulfonic acid or 85% sulfuric acid, after which it is quenched, as in water. This causes a white, opaque, spongy deposit of amorphous polyethyleneterephthalate to be formed on the surface of the article. This spongy amorphous deposit is sensitive to the vapors of certain organic solvents, which cause it to recrystallize to a substantially transparent condition. If the recrystallization is carried out in the presence of a modifying second substance, such as a finely-divided solid, the modifying material is encapsulated into the surface of the film.

---

This application is a continuation-in-part of our application Ser. No. 360,093, filed Apr. 15, 1964, now abandoned.

The invention relates to a method of converting the crystalline surface of a shaped article comprising polyethylene terephthalate to an amorphous form, and for subsequently treating at least a portion of the amorphous surface to cause said treated portion to recrystallize. In a preferred embodiment of the process, a second substance which modifies the nature of the film is added to the amorphous surface. Subsequent recrystallization of the amorphous surface encapsulates the added matter into the film.

By shaped article is meant films, foils, ribbons, fibers, yarns, woven or nonwoven fabrics, and the like, composed at least in part of a polyester formed from a glycol and terephthalic acid. Such polyester products are known commercially as Dacron (Du Pont) or Terylene (Imperial Chemical Industries) when in fiber, yarn, or fabric form, and as Mylar (Du Pont) or Melinex (Imperial Chemical Industries) in film form. The materials as met with commercially have a high degree of crystallinity, are molecularly oriented, have a rather abrupt melting point. and are hydrophobic. The surfaces of such articles are difficult to dye or to write on with simple aqueous inks, and are so dense and smooth as to resist the affixing thereto of other materials intended to alter the appearance or function of the surface. The surfaces are not heat-sealable, and resist adherence to many of the common adhesives normally used to promote adhesion to plastic surfaces.

In U.S. patent application Ser. No. 347,781, filed Feb. 27, 1964, now U.S. Patent No. 3,357,874, said application being of common assignee with the present application, there is described a process for treating a polyester film with chlorosulfonic acid or with sulfuric acid of about 85% concentration under such conditions as to cause a certain degree of solution of the polymeric substance on the surface of the film. There is also described a process for arresting the solvent action of the acid by quenching the acid-treated film in water, with the formation of a white opaque deposit of amorphous polyethylene terephthalate with adheres to the surface of the article and which alters the physical and chemical reactivity of said surface.

In contrast to the crystal-clear, highly-oriented crystalline surface of untreated polyethylene terephthalate film, the surface of a film treated in accordance with the process of application Ser. No. 347,781 is chalky, lusterless, and substantially opaque. Physically, the surface is porous and hydrophilic, so that it may be written on with water-based inks, or drawn on with water-color paints, in contrast to an untreated film which is non-receptive to water, so that ink and water colors tend to draw together thereon in the form of disconnected droplets. A treated surface, due perhaps to its porous spongy nature, may also be readily impregnated with dry pigments such as iron oxide or other coloring matter, with powdered graphite, or with a wide variety of finely-divided solid or liquid substances.

An addend applied to a treated surface of this sort, however, is only loosely and temporarily held thereon by virtue of being physically embedded in the spongy pores of the surface. Such an addend may be readily removed by physical means, as by gentle washing with soapy water. A legend written in water-based ink on a treated surface of this sort may readily be smeared and rendered less legible if the surface, after the ink has dried, is merely rubbed gently with a moistened finger.

In application Ser. No. 347,781 there is described a method for recrystallizing the amorphous surface of an acid-treated polyester film by means of a heating process, so that useful laminates may be made therefrom and so that a second substance, held in intimate contact with the amorphous surface during the heating process, is encapsulated into the surface by the recrystallization.

We have found that it is possible to treat the amorphous surface of a film of polyethylene terephthalate treated in accordance with the disclosure of U.S. patent application Ser. No. 347,781 so that the amorphous layer of polymer is reconverted to a crystalline state without the use of heat, the reconversion of the amorphous surface to a crystalline state being marked by the disappearance of the white chalky opaque surface deposit, and the restoration of a translucency or even transparency in the film, approaching the appearance the film possessed before acid treatment. By blocking or inhibiting the recrystallization of portions of the amorphous surface, varied areas of transparent and opaque polyethylene terephthalate can be produced. When this reconversion is effected while the amorphous surface of the film is in intimate contact with a second substance, or addend, the second substance becomes rather firmly embedded or encapsulated in the surface of the film and cannot subsequently be removed therefrom without destruction of the recrystallized film substance.

It is, therefore, an object of this invention to provide a process for recrystallizing an amorphous section of a polyethylene terephthalate shaped article. It is an additional object of the invention to promote such recrystallization while the surface of the shaped article is in contact with a modifying substance such as a fluid or a finely-divided solid.

It is also an object of this invention to provide such a process for promoting improved adhesion between the surface of a shaped article comprising crystalline polyethylene terephthalate and a second substance which it is desired to affix thereto.

We have found that the action of certain organic vapors has the surprising and unexpected effect of promoting recrystallization of acid-treated polyester films. In the above-mentioned application Ser. No. 347,781, it has been pointed out that the acid treatment involved minimal chemical alteration or degradation of the polymer, and that the heat-sealability developed was believed due to the difference between the polymer in a crystalline and in an amorphous state. It was quite unexpected, therefore, to discover that exposure of an acid-treated polyester film to the action of the vapor of a variety of organic materials which are not effective as solvents for the crystalline polyester would promote recrystallization of the film surface. This effect, we have found, is rapid and dramatic. The characteristic white chalky aspect of an acid-treated polyester film prepared in accordance with the disclosure of application Ser. No. 347,781 will revert, in a matter of seconds, to a nearly transparent aspect of the film is exposed to the vapors of, for example, acetone.

The following organic substances, in vapor form, have been found effective in the development of a translucent to a near-transparent aspect in an initially white and opaque acid-treated polyester film:

Aromatic hydrocarbons such as benzene, toluene, and xylene;

Aromatic aldehydes and ketones such as acetophenone and benzaldehyde;

Lower aliphatic ketones such as acetone, methyl ethyl ketone, and methyl isobutyl ketone;

Halogenated aromatic hydrocarbons such as chlorobenzene, dichlorobenzene, and trichlorobenzene; cyclic ethers and ketones such as dioxane and cyclohexanone;

Lower aliphatic acids and esters such as formic, acetic, and propionic acids, ethyl acetate, and isopropyl acetate;

Lower incompletely halogenated alkones such as methylene chloride, chloroform, propyl bromide, 1-4 dibromobutane, and tetrachloroethane;

Lower halogenated olefins such as tetrachloro ethylene;

And miscellaneous solvent vapors such as those from tetrahydrofuran, epichlorohydrin, nitromethane, and dimethyl sulfoxide.

Solvent vapors found ineffective in promoting the recrystallization process comprise the aliphatic alcohols such as methanol and ethanol; alkanes such as heptane; completely halogenated alkanes such as carbon tetrachloride and trichlorotrifluoroethane; ethylene glycol; ethyl ether, and carbon disulfide.

On a basis of cost and efficiency, our preferred solvents are the lower aliphatic ketones, lower aliphatic esters, the lower incompletely halogenated alkanes, and the lower halogenated olefins.

The drawing is a flow sheet of the process.

The following example will illustrate one method of utilizing the vapor-sensitivity of an acid-treated polyester film for the decoration thereof.

Example 1

A sheet of Mylar film 0.003 inch thick was immersed in 96% sulfuric acid at room temperature for a period of five seconds, after which it was quenched in 10% ammonium hydroxide, rinsed with water, and dried. The surface of the dried film was chalky, white, and opaque, and was found to accept water-based inks and paints quite readily, in contrast to the water-repellent nature of the original film.

A design and legend was drawn on a sample of the treated film, using a water-base ink known as Scheaffer's Washable Blue Skrip. The blue design and legend were prominent against the white opaque film.

The sample was cut into two parts. One part was held in the vapor arising from warmed acetone (about 50° C.) for a period of three to five seconds, the other part being untreated. The part exposed to acetone vapor changed from opaque white to nearly transparent, and became shiny and lustrous. Both pieces of film were then tumbled gently in warm soapy water. The design and legend on the opaque, untreated part of the film were rapidly washed away, only a faint trace remaining after the film was rinsed and dried. There was substantially no bleeding from the piece of film which had been exposed to acetone vapor, and the design and legend remained clear, prominent, and firmly affixed in the surface of the film.

It will be apparent that the process of this invention has several advantages. First, by masking selected areas of the acid-treated film, exposure to solvent vapors will develop recrystallization only in the unmasked areas, for decorative purposes or for developing a desired legend in clarity contrast. Second, it allows clear outlines of decorative or informative matter, composed of water-dispersed dyes or pigments, to be applied to the surface of a polyester film which in its normally crystalline and biaxially oriented form would not receive such matter uniformly. Third, it allows the conversion of such a decorated or imprinted film to a nearly transparent state, in which the imprint is firmly fixed into the surface of the film, without the use of extraneous binders or adhesives, and without a heating process. This nearly transparent state is marked by the return of the substance of the film surface to a crystalline state, in which state it is not heat-sensitive and is highly resisant to the effects of most common organic solvents. In addition to inks and pigments, a wide variety of finely divided particulate substances may thus be imbedded in a polyethylene terephthalate film, such as graphite, magnetic iron oxide, fine abrasive matter, inorganic salts and the like.

We have also found that immersing an acid-treated polyester film in certain liquid solvents chosen from the class of operable organic solvents set forth above will effect a certain degree of recrystallization of the amorphous film surface, as evidenced by a reduction in the film opacity. Especially effective in liquid form are acetone, methyl ethyl ketone, cyclohexanone, ethyl acetate, benzyl alcohol, dioxane, benzene, benzaldehyde, methylene chloride, chloroform, tetrahydrofuran, N,N-dimethyl formamide, and epichlorohydrin. It is difficult, however, to separate the action of solvent vapor from solvent, especially with the lower boiling solvents, since the action of the vapor is very rapid, and in common practice a bath of liquid solvent has superimposed thereupon a layer of solvent vapor through which the threated film must pass. Additionally, there is the possibility, when using solvent in liquid form, of removing a certain amount of film substance before recrystallization is effected, as well as the possibility of liquid solvent interference with the substance it is desired to encapsulate into the film surface. For these reasons, treatment of the film with solvent vapor is our preferred method of practising our invention. However, the term "solvent" for amorphous polyethylene terephthalate will mean, for the purposes of this invention, substances which will promote the recrystallization of the amorphous white surface deposit formed according to U.S. Ser. No. 347,781, whether used in liquid or vapor form.

The tensile strength of a polyethylene terephthalate film is decreased by 20% to 30% when the film is treated with sulfuric or chlorosulfonic acid and quenched in water according to the method set forth in Example 1, above. This loss in strength is substantially completely restored when the film is treated with solvent vapor in accordance with the practise of this invention.

In addition to the above-mentioned utilities of the process of this invention, the process is also useful for promoting adhesion between a polyester film and other classes of substances, such as pressure-sensitive adhesives. It is recognized in the adhesive tape art that it is difficult to effect a satisfactory bonding between an oriented crystalline polyester film and many common pressure-sensitive adhesive systems, by a solvent-spreading process, without first priming or sub-coating the film. We have found, however, that if a pressure-sensitive adhesive is dissolved in a solvent which promotes recrystallization of the amorphous surface of an acid-treated polyester film, as set forth above, the spreading of such an adhesive solution on an acid-treated film results in the adhesive mass being strongly bonded to the film, as set forth in the following example.

Example 2

A polymer suitable for use as a pressure-sensitive adhesive was prepared according to Example 12, Table III, of U.S. Patent No. 3,299,010, issued Jan. 17, 1967, by one of the inventors of the instant application. The adhesive polymer was prepared from 1 mole equivalent of ethylacrylate, 4 moles of a 2-ethylhexyl acrylate, and 1 mole of a mixture of t-alkyl maleamic acids. This mixture of t-alkyl maleamic acids was prepared by reacting maleic anhydride with a mixture of alkyl amines marketed by Rohm and Haas as Primene 81–R.

When a 20% solution of this adhesive polymer in methyl ethyl ketone was spread on the surface of a normal Mylar film of commerce, the polymer after evaporation was found to be poorly bonded to the film. When tapes cut from such a film were plied together and then separated, the adhesive mass delaminated irregularly from one or the other of the films, indicating a higher degree of internal cohesion in the adhesive polymer than adhesion to the Mylar film.

A Mylar film 0.003 inch thick was treated with sulfuric acid, rinsed, and dried according to the procedure of Example 1 except that only one surface of the film was exposed to the acid. The treated surface had the characteristic white, chalky appearance of amorphous polyethylene terephthalate, mentioned above. When a 20% solution of the above adhesive polymer in methyl ethyl ketone was spread onto the opaque amorphous surface of the acid-treated polyester film, there was an almost instantaneous disappearance of the opacity and a development of a highly translucent aspect in the film. After solvent evaporation, tape strips were cut from the coated film. When two such strips were pressed together with their adhesive faces in contact, separation of the two tapes was unmarked by any adhesive mass transfer from one tape to the other, both tapes retaining their adhesive mass intact. This indicates that the bond between the adhesive mass and the recrystallized film was stronger than the internal cohesion of the adhesive polymer. The strong bond between film and polymer persisted even when the plied tapes were heated to 100° C. for 10 minutes.

In addition to pressure-sensitive adhesive tapes, thermoplastic and thermosetting adhesive tapes may be prepared utilizing the process of this invention, as illustrated in the following example.

Example 3

Following the general procedure of Example 2, a 12.5% solution of a polyurethane rubber known as Estane 5740X2 (B. F. Goodrich) in a 1 to 1 mixture of methyl ethyl ketone and tetrahydrofuran was spread on the treated face of a sulfuric acid-treated Mylar film. The film became transparent almost instantly, after which it was air dried and then heated to 110° C. to complete removal of solvent. After thorough drying, two samples of the polymer-coated film were plied together with the coated faces in contact with each other. The assembly was heated in an oven to 120° C., removed, and cooled. Attempts to separate the tapes led to rupture of the Mylar film, indicating high adhesion of the urethane polymer to the polyester film surface.

In the preparation of adhesive tapes according to this process, it is preferable that the solvent used be a solvent for the adhesive mass and for the amorphous polyethylene terephthalate.

Having thus described our invention, we claim:

1. A process for treating the surface of a shaped article composed at least in part of highly crystalline polyethylene terephthalate which comprises
exposing said surface to the action of an acidic substance chosen from the class consisting of chlorosulfonic acid and sulfuric acid of at least about 85% concentration for a period of not more than 300 seconds,
arresting the action of the acid substance by quenching the surface-treated article in an aqueous medium, whereby a white opaque deposit of amorphous polyethylene terephthalate is formed on said surface,
and recrystallizing the amorphous polymer in at least a portion of said amorphous surface by exposing at least a portion of said surface to the action of a solvent selected from the class consisting of aromatic and halogenated aromatic hydrocarbons, aromatic aldehydes and ketones, the lower aliphatic ketones, cyclic ethers and ketones, the lower aliphatic acids and esters, the lower incompletely halogenated alkanes, the lower halogenated olefins, tetrahydrofuran, epichlorohydrin, nitromethane, and dimethyl sulfoxide.

2. The process according to claim 1 in which the recrystallization is effected while at least a portion of the amorphous surface is impregnated with a second substance.

3. The process according to claim 2 in which the second substance is a fluid possessing tinctorial value.

4. The process according to claim 2 in which the second substance is a finely-divided particulate solid.

5. A process for improving the bond between an adhesive mass and the surface of a film consisting at least in part of polyethylene terephthalate which comprises
exposing said surface to the action of an acidic substance chosen from the class consisting of chlorosulfonic acid and sulfuric acid of at least about 85% concentration for a period of not more than 300 seconds,
arresting the action of the acidic substance by quenching the surface-treated film in an aqueous medium, whereby a white opaque deposit of amorphous polyethylene terephthalate is formed on said surface,
and spreading onto said surface an adhesive mass dispersed in a medium which is a solvent selected from the class of solvents consisting of aromatic and halogenated aromatic hydrocarbons, aromatic aldehydes and ketones, the lower aliphatic ketones, cyclic ethers and ketones, the lower aliphatic acids and esters, the lower incompletely halogenated alkanes, the lower halogenated olefins, tetrahydrofuran, epichlorohydrin, nitromethane, and dimethyl sulfoxide.

6. The process according to claim 5 in which the medium in which the adhesive mass is dispersed is a solvent for said mass as well as for said amorphous polyethylene terephthalate.

References Cited
UNITED STATES PATENTS

| | | |
|---|---|---|
| 2,962,454 | 11/1960 | McRae et al. _____ 117—138.8 |
| 3,035,916 | 5/1962 | Heiart _____ 117—47 |
| 3,035,941 | 5/1962 | Cohen et al. _____ 117—47 |
| 3,135,622 | 6/1964 | Ramalli _____ 117—47 |
| 3,142,581 | 7/1964 | Leland _____ 117—138.8 |
| 3,235,426 | 2/1966 | Bruner _____ 156—2 |
| 3,255,060 | 6/1966 | Neumann et al. _____ 117—47 |
| 3,357,874 | 12/1967 | Kennedy _____ 117—47 |

MURRAY KATZ, *Primary Examiner.*

U.S. Cl. X.R.

117—47, 63, 122, 138.8